Aug. 29, 1939.  C. A. NERACHER ET AL  2,170,869
POWER TRANSMISSION
Filed Nov. 26, 1937    6 Sheets-Sheet 1

INVENTORS.
Carl A. Neracher,
William T. Dunn.
BY
ATTORNEYS.

Patented Aug. 29, 1939

2,170,869

UNITED STATES PATENT OFFICE 2,170,869

POWER TRANSMISSION

Carl A. Neracher and William T. Dunn, Detroit, Mich., assignors to Chrysler Corporation, Highland Park, Mich., a corporation of Delaware Application November 26, 1937, Serial No. 176,606

22 Claims. (Cl. 74—262)

Our invention relates to power transmission mechanism and refers more particularly to improvements in power transmission systems especially adapted for use in connection with motor vehicles, although not necessarily limited thereto.

In certain more limited aspects the invention provides improvements in the drive and control of power transmission systems of the general class having epicyclic or planetary gear trains. It is customary with such planetary transmissions to arrange the gearing to provide the desired number of speed ratios between the engine and the vehicle driving ground wheels, and such gearing is customarily selected and controlled to obtain the desired driving speed ratio by actuation of any one of a group of transmission controlling devices usually consisting of reaction brake bands associated with and controlling the rotation of corresponding drums or similar elements of the various gear trains.

An object of our invention resides in the provision of a novel and inexpensive means for effecting, in response to the selection of a speed ratio, the desired degree of engagement of the selected speed ratio controlling device of the transmission.

Another object of our invention, in certain more limited aspects, is to provide a pump pressure regulating means whereby the proper fluid pressure, which fluid pressure actuates the pressure operating means for operating the speed ratio controlling devices of the planetary gear trains or other corresponding types of transmission, is effected to provide in response to the selection of a speed ratio the desired degree of engagement of the selected speed ratio controlling device. In the broader aspects of our invention the fluid pressure is preferably provided by a suitable liquid medium such as oil, but the fluid pressure medium may be air under pressure greater or less than atmospheric pressure.

A further object of our invention resides in the provision of a simple and efficient means for regulating the well known swash plate pump in order to provide, in response to the selection of a speed ratio, the proper maximum fluid pressure to effect the degree of engagement of the selected transmission speed ratio controlling device necessary to control the torque transmitted by the selected speed ratio gear train.

More specifically, the invention has for one of its objects the provision of yieldable means for selectively varying the pressure delivery of a swash plate pump in accordance with the selective operation of the fluid actuated speed ratio controlling devices of a transmission mechanism.

A still further object of our invention is to provide a convenient means for effecting a regulatable even increase and decrease of slippage of the selected speed ratio controlling device; and additional means for effecting, in response to the selection of a speed ratio and the positioning of the first said means in its normal condition, the desired degree of engagement of the selected speed ratio controlling device of the transmission.

An additional object of our invention resides in the provision of a convenient means for effecting a regulatable even control to zero pressure of the fluid pressure produced by the well known swash plate pump, and additional means for effecting, in response to the selection of a speed ratio and the positioning of the first said means in its normal condition, the proper maximum fluid pressure of the pump to produce the degree of engagement of the selected transmission speed ratio controlling device necessary to control the torque transmitted by the selected speed ratio gear train.

Further objects and advantages of our invention will be apparent from the following detailed descriptions of several illustrative embodiments of the principles of our invention, reference being had to the accompanying drawings in which:

Fig. 6 is an enlarged sectional view taken along the line 6—6 of Fig. 1 through the transmission and fluid clutch.

Figures 1, 2:
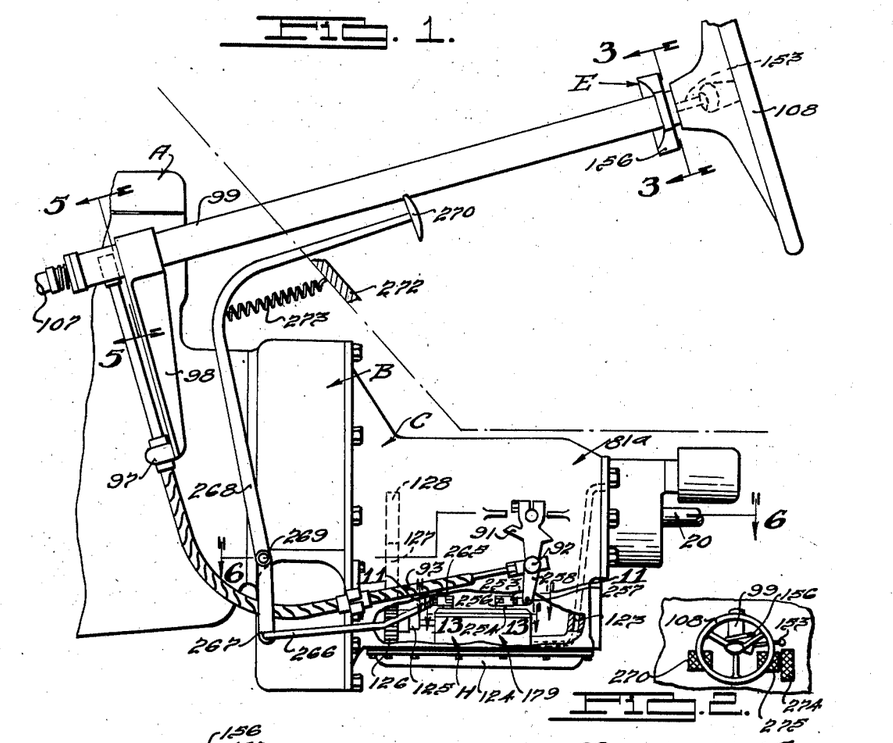
Fig. 1 is a side elevational view, somewhat diagrammatic in form, illustrating our power transmission mechanism as a whole.
Fig. 2 is a detail elevational view showing the manually controlled selector element and the well known clutch, brake and accelerator pedals of a motor vehicle.

Referring now to the drawings, we have illustrated our invention in connection with a motor vehicle drive, this drive including a prime mover or engine A, a portion of which is shown in Fig. 1, a main clutch B driven from the engine, and a change speed transmission or gear box C driven from the clutch B. The drive passes from the transmission through the power take-off shaft 20, which, as usual, may extend rearwardly of the vehicle to drive the usual ground wheels (not shown).

The clutch B may be of any suitable construction for controlling the drive between engine A and transmission C, this clutch being illustrated in Fig. 6 in the form of a fluid coupling type having the usual driving and driven cooperating vane members 21 and 22 respectively. The driving vane member 21 is carried by the engine flywheel 23, the latter being connected as usual with the rear end of the engine crank shaft 24. The driven vane member 22 is splined to a hub 25 which in turn is splined at 26 on the forward end of the driven shaft 27. This driven shaft extends rearwardly to drive the power take-off shaft 20 through the intermediary of the various gear trains of transmission C.

Where the power means for operating the transmission is afforded by a fluid such as oil under pressure, the pump for placing the oil under pressure is preferably operated from the engine to maintain the fluid pressure even when the pump is idling. It is therefore preferred to provide a pump drive from the driving clutch member 21 rather than the driven clutch member 22 inasmuch as the latter may be stationary under certain conditions of vehicle operation such as when the vehicle is standing still with the engine idling.

This pump drive may be provided by reason of a driving sleeve or hollow shaft 29 mounted on the shaft 27 but rotatable independently thereof. The sleeve 29 has a hub or flange 30 connected at 31 with the driving vane member 21 of the clutch B so that even when the driven vane member 22 is not being operated from the driving vane member 21, the sleeve 29 will be rotatably driven from the engine crankshaft 24 and flywheel 23. The pump drive from sleeve 29 will be more apparent hereinafter.

We have illustrated the fluid type of clutch B since a clutch of this character has a number of advantages in connection with a transmission of the planetary gear type C and in further connection with our arrangement of vehicle driving controls which will be presently described more in detail. Among the advantages of the fluid type of clutch are the provision of a smooth drive for the vehicle through the planetary transmission, relatively high power driving efficiency, automatic release of the drive between the engine and transmission when the engine is idling, and with the transmission manipulated to establish one of its driving gear ratio settings, and other well known favorable characteristics. We desire to point out, however, that other types of clutches may be employed to control the drive between engine A and transmission C within the broader aspects of our invention. For example, the well known type of friction clutch may be employed and manually operated or automatically operated by the well known commercial type of vacuum clutch releasing mechanism as will be readily understood.

We have illustrated the change speed transmission C as the epicyclic or planetary type, this general form of transmission being well known in the art and, as usual, includes a plurality of transmission speed ratio controlling clutches or brakes 32, 33, 34 and 35, these braking controlling devices being respectively adapted to actuate the transmission in its first speed ratio or low gear, second speed ratio or intermediate gear, third speed ratio or direct drive, and reverse drive. Other speeds may be provided as desired.

Figure 7:
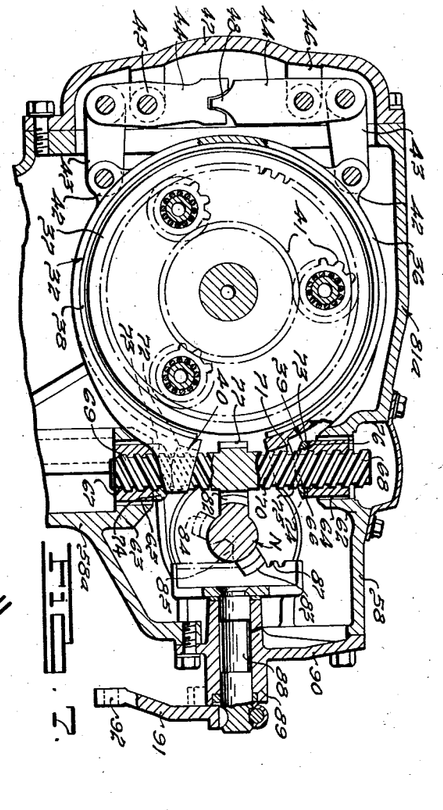
Fig. 7 is a vertical sectional view through the transmission illustrating one of the speed ratio controlling devices and parts associated therewith, the section being taken as indicated by the line 7—7 of Fig. 6.

The typical brake device 32 illustrated in Fig. 7 consists of an outer band 36 which substantially surrounds the rotary element or drum 37, the band being provided with friction braking material 38 carried by the band and adapted for frictional engagement with the drum 37. The band 36 has its ends formed with laterally projecting actuating flanges 39 and 40 positioned adjacent each other, means being provided to move the band ends toward each other to contract the band 36 for causing the friction material 38 to brake rotary drum 37, the band having sufficient inherent resilience to expand away from contact with the drum when the actuating means is relieved at the flanged ends 39 and 40. In Fig. 7 the low speed ratio braking device 32 is illustrated in its inoperative position whereby the drum 37 is free to rotate through operation of the planetary gear set 41 somewhat diagrammatically illustrated in association with the drum 37. When the braking device 32 is actuated by contracting the band 36, the drum 37 is held against rotation, the driven shaft 20 in such instance being operated through the planetary gearing 41 to provide the low speed drive for the motor vehicle.

In order to anchor the band 36 and to substantially equalize the braking forces applied to drum 37 around the periphery thereof and thereby substantially avoid a tendency toward lateral loading of the drum and planetary gearing transverse to the axis of the drum, we have provided the band with a circumferentially spaced pair of anchoring flanges 42. These flanges are connected through links 43 with the levers 44 pivotally mounted at 45 with the supporting bracket 46 of the transmission side cover casing 47, the levers 44 being interlocked at 48 so that movement of one of the flanges 42 will be transmitted through the pivotal levers 44 and the links 43 to the other portion of the band associated with the anchoring device. The links 43 are thus pivotally connected at their opposite ends respectively with the anchors 42 and levers 44.

The third speed clutching controlling device 34 is arranged for a direct drive through the transmission and differs somewhat from the braking devices 23, 33 and 35 in that the controlling device 34 has its rotary controlling element 50 adapted for clutching action in a well known manner by frictional engagement through the discs 51 by an axially movable clutching member 52. The latter clutching member is thus engaged by the yoked end 54 of an actuating lever 55 pivotally mounted by a pin 56 suitably supported in the transmission casing. On the opposite side of pivot 56 the lever 55 is provided with a step actuating portion 59, the purpose of which will presently be more apparent.

The transmission casing portions 58 and 58ª are respectively provided with the vertically spaced inwardly extending supporting brackets 62 and 63, respectively, these brackets being formed with coaxial splined openings 64 and 65, respectively. Splined within these openings are the nuts 66 and 67 which are axially and oppositely threaded to receive the correspondingly threaded ends 68 and 69 of an operating oscillatory shaft or screws 70.

The shaft 70 extends through openings 71 and 72, respectively, formed to open laterally in the aforesaid band ends 39 and 40, these openings having considerable clearance with shaft 70 so as not to bind on the shaft when the band is contracted and expanded. In order to transmit the thrust of the nuts 66 and 67 to the flanges 39 and 40 so as to relieve distorting loads on the shaft 70 and parts associated therewith, each nut operates a sleeve 73 having a curved face 74 engaging a curved face 75 of band end 39 or 40. The engaged curved faces 74 and 75 provide a rocking freedom of action, each sleeve 73 having a clearance indicated at 76 with the shaft 70.

The operating shaft 70 of the low speed braking device 32 has its portion thereof intermediate the band ends 39 and 40 formed with a gear 77, the means for oscillating shaft 70 through the gear 77 being hereinafter more particularly described.

In the operation of the low speed controlling device 32 as thus far described, it will be apparent that when the shaft 70 is given a rotary movement, such movement operates through the oppositely threaded ends 68 and 69 of the shaft 70 to cause the nuts 66 and 67 to move inwardly toward each other in their splined openings 64 and 65 respectively, this movement acting through the sleeve 73 to contract the band ends 39 and 40 whereby the low speed drum 37 has its rotation checked for establishing the low speed drive through the transmission. When the shaft 70 is rotated in the opposite direction, the nuts 66 and 67 are moved away from each other and the band 36 is expanded to permit the drum 37 to again rotate and thereby relieve the drive through the transmission controlling device 32.

In order to avoid repetition we have not illustrated all of the details of the brake operated means associated with the controlling devices 33 and 35, it being understood that such operating means are similar to that described in connection with the controlling device 32. For convenience of reference the operating shaft or screw for the reverse speed braking device is designated as 70ª and the corresponding shaft for the second speed braking device 33 is designated as 70ᵇ. The gears associated with these screw shafts are respectively designated as 77ª and 77ᵇ. As will be more apparent presently, the gears 77, 77ª and 77ᵇ and lever end 59 are adapted to be selectively operated in order to selectively control the engagement and release of the respective speed ratio controlling devices 32, 35, 33 and 34.

The transmission casing is adapted to support in a forward opening 78 the reciprocating and oscillating rack or actuating shaft D. The rear bearing for shaft D is provided by a member 79 which is disposed in a suitable opening 80 in the rear end wall 81 of the transmission casing 81ª, the rear end of the actuating shaft D being also supported by a piston for reciprocating the shaft and which will presently be referred to in detail.

This actuating shaft D has a series of teeth forming a rack adapted to be brought into operative association with each of the screw gears, these racks being designated at 82, 83 and 84 for respectively operating the screw gears 77, 77ª, and 77ᵇ. The forward end of shaft D is further provided with a third speed actuating projection 85 adapted for engagement with the lever shoulder 59 for operating the third speed controlling device 34. It will be noted that the racks and projection 85 are longitudinally spaced along the shaft D and that they are also spaced circumferentially of the shaft whereby upon progressive rotation of the shaft only one of the racks and the projection 85 will engage its associated screw gear or lever 55 at any time.

In Figs. 6 and 7 it will be noted that the shaft D is positioned so that the low speed rack 82 is in position for operating the low speed gear 77 and when the shaft D is moved forwardly or to the left as viewed in Fig. 6, the low speed screw 70 will be rotated to cause the aforesaid braking operation of the low speed controlling device 32 for establishing the low speed drive through the transmission. It will furthermore be noted that with the low speed rack 82 in the position illustrated, the remaining racks 73, 84 as well as projection 85 are free from engagement with their respective associated gears 77ª, 77ᵇ, and the lever 55. From Figs. 6 and 7 it will be noted that the shaft D has a space longitudinally and circumferentially between the second speed rack 84 and the direct drive projection 85, this space being designated as the neutral space "N" so that when the shaft is positioned with this space facing the screw gears, each of the racks as well as projection 85 will be free from contact with their associated screw gears and lever 55, and the transmission will be in neutral at which time the various braking devices 32, 33, 34 and 35 are released.

In order to selectively rotate the rack D for selectively engaging the racks and projection 85 thereof with the respective screw gears and lever 55, and also for axially operating the shaft in the various positions of selective adjustment, the following mechanism is provided.

Rearwardly adjacent the reverse rack 83, the shaft D is provided with a circular rack or gear 86 meshing with a segmental rack 87 rotatably fixed with a shaft 88, best shown in Fig. 7, this shaft being rotatably journalled by a bearing 89 carried by the transmission side cover 90. The shaft 88 has fixed thereto, outwardly of the transmission cover, a lever 91 connected at 92 (see Fig. 1) to a Bowden wire operating mechanism 93.

Figures 3, 4, 5:
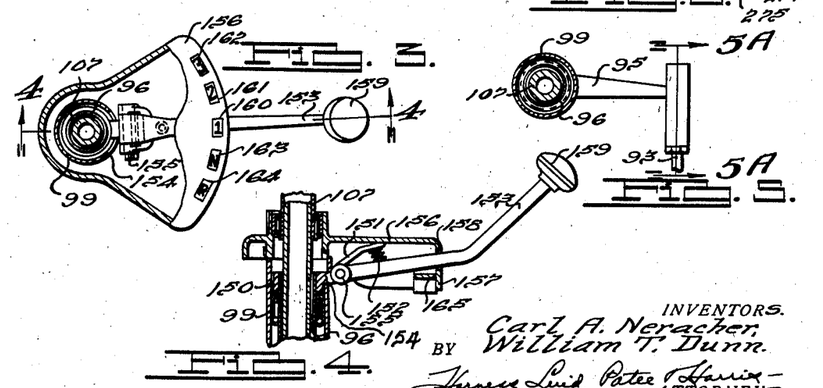
Fig. 3 is a sectional view of the manually controlled selecting mechanism taken as indicated by the line 3—3 of Fig. 1.
Fig. 4 is a detail sectional view along the line 4—4 of Fig. 3.
Fig. 5 is an enlarged sectional view taken approximately as indicated by the line 5—5 of Fig. 1.
Figures 5, 5A:
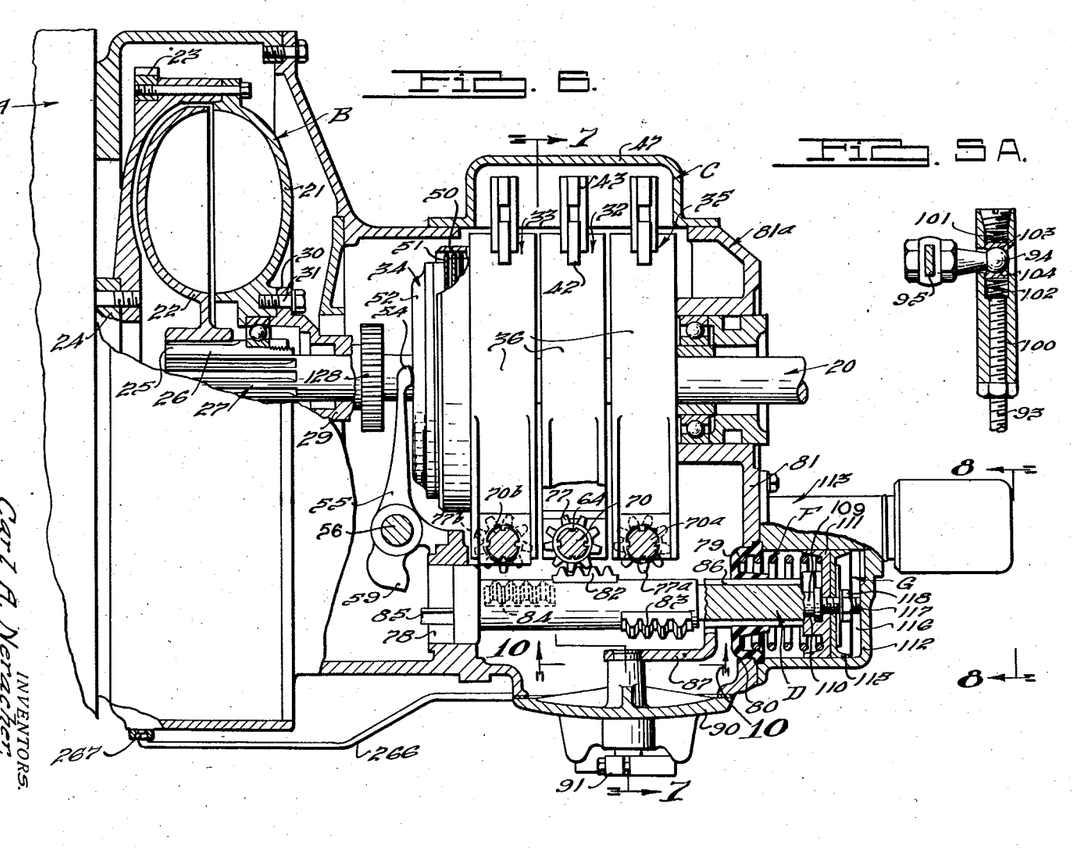
Fig. 5A is an enlarged detailed sectional view taken along the line 5A—5A of Fig. 5.

The Bowden wire operating mechanism 93 extends forwardly for pivotal connection with a ball end 94 of a lever assembly 95 secured to a tubular shaft 96 as shown in Figs. 5 and 5A. The forward end of the Bowden mechanism has a guide 97, provided by the bracket 98 rigidly secured to the outer stationary tubular housing 99 comprising the steering post, as best shown in Fig. 1. A yielding connection is preferably provided at some convenient point between the manual selector element, which will be shortly described, and the segmental rack 87 for rotatably adjusting the shaft D. We have illustrated this yielding connection in Fig. 5A intermediate the lever ball end 94 and the forward end of the Bowden wire mechanism 93. The wire 93 is anchored at its forward end to a housing 100 provided with preloaded oppositely acting springs 101 and 102 which respectively act against the ball seats 103 and 104. The springs 101 and 102 have sufficient rigidity so that normally they provide a rigid connection between lever 95 and Bowden wire 93. However, if for any reason the manually operated adjusting mechanism for the shaft D should bind at any point, the mechanism will be protected during any manual adjustment of lever 95 under such conditions by reason of the ability of springs 101 and 102 to yield. This yielding connection is therefore in the nature of a safety device for the manually controlled selector operating mechanism. The hollow operating shaft 96 extends within the housing 99 and is suitably rotatably journaled therein.

Rotatable within the hollow shaft 96 is the hollow steering shaft 107 operably connected at its upper end to a steering wheel 108 and adapted for operable connection at its lower end to the usual steering mechanism for the front ground wheels of the motor vehicle (not shown.) The hollow operating shaft 96 extends upwardly to the point preferably just below the steering wheel 108 to the manually controlled device generally designated at E for selectively controlling or manipulating the transmission speed ratios as will be presently more apparent.

Figures 8, 9, 10:
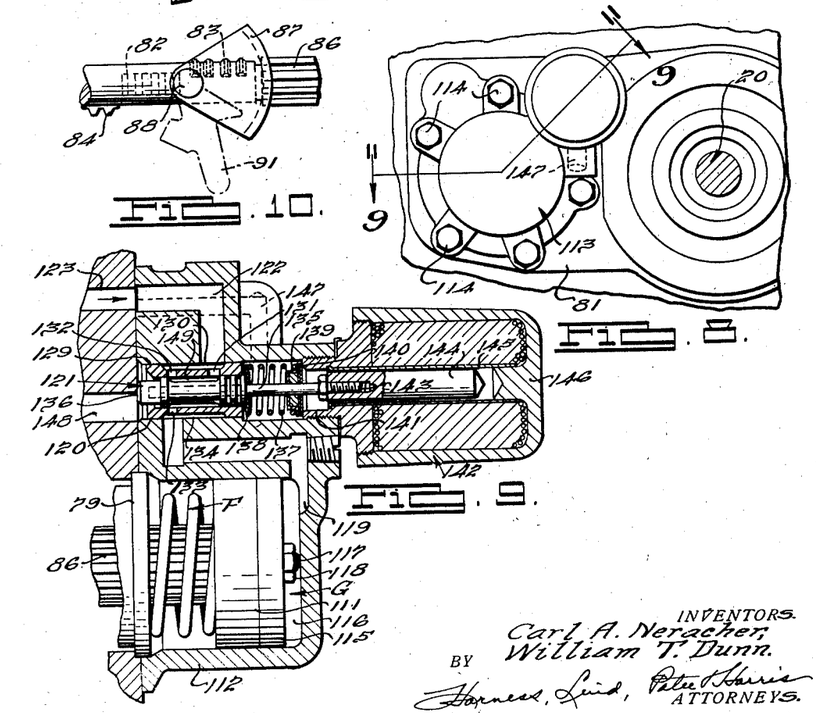
Fig. 8 is a vertical elevational view illustrating the housing mechanism for the fluid pressure operator and associated control valve, the view being taken approximately as indicated by the line 8—8 of Fig. 6.
Fig. 9 is an enlarged sectional view taken along line 9—9 of Fig. 8.
Fig. 10 is a detail sectional view taken approximately as indicated by the line 10—10 of Fig. 6.
Figure 11:
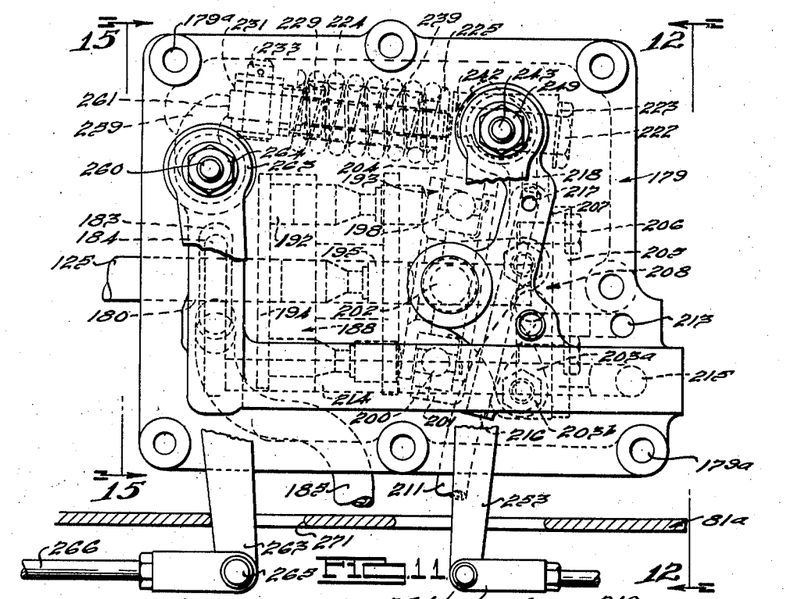
Fig. 11 is an enlarged elevational view of our pressure pump and pressure regulating means, the view being taken approximately as indicated by the line 11—11 of Fig. 1.
Figure 12:
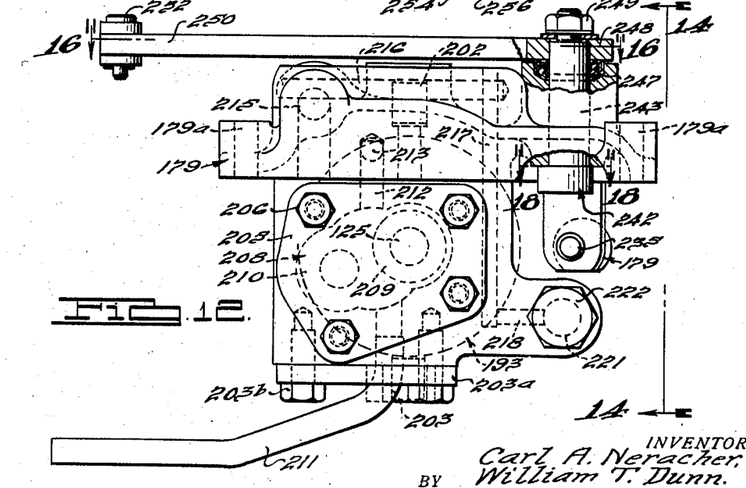
Fig. 12 is an end elevational view taken along the line 12—12 of Fig. 11.

Returning now to Fig. 6, the selector rack shaft D has its rear end adjacent the circular rack 86 provided with a groove 109 adapted to receive the flange 110 of the fluid pressure operating piston assembly 111 adapted for reciprocal movement in the cylinder 112 which is a part of a casting 113 best illustrated in Figs. 8 and 9 as attached at 114 to the rear wall of the transmission. The piston 111 provides the actuating member of the power operating means G for moving shaft D under power to engage the various brake bands and the direct speed clutch 34.

For yieldingly urging the rack shaft D to the right or rearwardly to release the speed ratio controlling devices, we have provided prime mover means F preferably in the form of a compression coil spring surrounding the rear end portion of shaft D between the fixed abutment provided for the bearing member 79 and acting on piston 111. In Fig. 6 it will be noted that the bearing member 79 is conveniently held in position by clamping the same between the rear casing wall 81 of the transmission and the casting assembly 113.

The piston 111 has a flexible sealing cup 115 adapted to seal the piston against escape of the fluid forwardly of the cylinder 112, the cup 115 bearing against the walls of the cylinder under the action of the fluid pressure introduced to the pressure chamber 116. The sealing cup is held in place by the rearwardly extending threaded reduced fastener or nut 118. Fluid, such as oil under pressure, is introduced to the pressure chamber 116 as best shown in Fig. 9, through a passage 119 leading to the valve controlled chamber or cylinder 120 which slidably receives the fluid pressure supply controlling valve 121.

The cylinder 120 is supplied with oil under pressure through a passage 122 which receives the oil by a conduit 123 formed in the transmission casing casting. The conduit 123, as best shown in Fig. 1, leads to the delivery side of a swash plate type pump H driven from its location in the oil storing sump or reservoir 124 of the transmission casing by reason of the shaft 125 provided at its forward end by a driving gear 126. This gear meshes with an idler gear 127 which in turn meshes with the driving pinion 128 (see Fig. 6) carried on the rear end of the driving sleeve 29 which, as aforesaid, is fixed to the fluid impeller 21.

A valve guide porting member 129 is pressed into the cylinder 120 so as to be fixed therewith, this porting member having an annular groove 130 communicating with the passage 122 and radially extending ports 131 and 132, the latter being adapted to be placed in communication by the valve 121 with an oppositely disposed port 133 communicating with the passage 119. This valve has a sliding fit within the cylinder bore 134 of the porting member 129. A valve operating rod 135, preferably of brass or other non-magnetic material extends axially through the valve with sufficient clearance to prevent binding thereof. The rod 135 extends beyond the valve and has a stop 136 for limiting movement of the valve by a spring 137 disposed between abutments 138 and 139, the latter having associated therewith the sealing washers 140 acting against a threaded stem of the electrical solenoid 142.

The rear end of valve operating rod 135 is connected at 143 with the armature 144 of solenoid 142, the armature being adapted for reciprocation in the solenoid cylinder 145 having the rear abutment 146. Any fluid which may leak rearwardly beyond the valve 121 is adapted to drain downwardly from the portion of casting 113 which encloses the valve operating spring 137 by reason of the drain conduit 147, this conduit then extending forwardly to the main body of the transmission where the oil is permitted to drain back to the reservoir 124. A further conduit 148 is adapted to return the oil from operating cylinder 116 back to the reservoir, this conduit 148 opening rearwardly to the forward end of valve 121.

The valve 121 has the reduced valving portion 149 adapted to place the conduits 122 and 119 in communication by means of the annular groove 130 and ports 131, 132 and 133, when the valve is in its forward position under the influence of spring 137. In the drawings, the parts are shown in their positions for operating the low speed controlling device 32, the valve 121 being positioned forwardly so that the fluid pressure is just being delivered from the supply conduit 122 to the conduit 119 and the pressure chamber 116 of the cylinder 112. When the valve 121 moves rearwardly under the influence of solenoid 142, as will be presently more apparent, the spring 137 will be compressed and the reduced portion 149 will no longer provide communication between conduits 122 and 119 to supply fluid pressure from the pump H to operate the piston 111 and selector rack shaft D forwardly for actuating one of the speed ratio controlling devices 32, 33, 34 or 35, depending on the rotative selective adjustment of the selector rack shaft, as will be presently more apparent.

The function and operation of the manually controlled selector mechanism E in relation to the selector rack shaft D will now be further described.

Secured to the upper end of the hollow operating shaft 96, as best seen in Fig. 4, is an annular collar 150 having an integral laterally extending projection 151 providing an abutment for a spring 152 which has its lower end yieldingly acting against an intermediate portion of a manually operated selector element or lever 153. It will be noted that the extension 151 projects through an arcuate opening 154 of the fixed housing 99 to accommodate oscillating adjustment of the extension 151.

The inner end of selector lever 153 is pivotally mounted at 155 to an intermediate portion of the collar extension 151 so that the selector lever may have vertical movement on pivots 155 relative to the extension 151 but when lever 153 is moved around the axis of the steering post housing 99, the collar 150 together with its extension 151 and the shaft 96 will be rotatively moved as a unit.

Fixed on the upper end of the housing 99 is a housing 156 preferably in the shape of a sector. The outer end of this housing has a downwardly extending flange 157 provided with an arcuate opening 158 through which the lever 153 extends for arcuate adjustment. The outer end of the selector lever is provided with a knob or handle 159 adapted for convenient grasp by the hand of the motor vehicle driver.

The outer curving edge of housing 156 is preferably formed with a number of legends characterizing the various positions of manual adjustment of selector lever 153 depending on the number of stations of adjustment for this lever. In the particular embodiment illustrated, the selector lever 153 is adapted to have five positions of adjustment 160, 161, 162, 163 and 164 bearing the legends indicated in Fig. 3 designating the lever positions corresponding to first, second, third, neutral and reverse conditions of control for the transmission.

The flange 157 of housing 156 carries an arcuately arranged switch mechanism below the selector lever 153, this mechanism being best illustrated in the wiring diagram of Fig. 17. This switch comprises an arcuate floor 165 provided with a series of grooves or notches 166, 167, 168, 169 and 170 corresponding respectively to the positions of selector lever 153 when adjusted to the stations 160 to 164, inclusive. The upper sides of the aforesaid notches are preferably chamfered or beveled, as shown in Fig. 17, and the portion of selector lever 153 engageable with these notches is likewise beveled as indicated at 171.

When the operator desires to select any condition of control of the transmission, he swings the selector lever 153 into the desired position, the spring 152 yieldingly urging the selector lever downwardly into engagement with one of the notches of the switch member 165.

Figure 17:
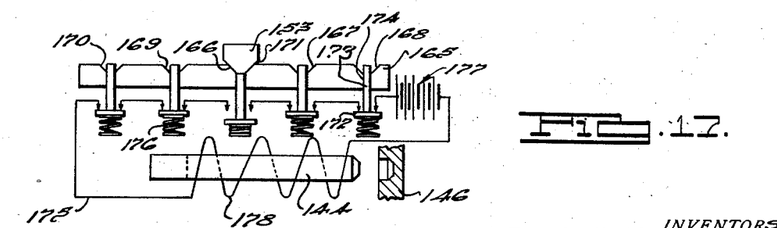
Fig. 17 is a diagrammatic view illustrating the electrical system of control between the manually operated selector element and the fluid pressure control valve mechanism.

Referring now to the wiring diagram of Fig. 17, a plurality of switches or contacts 172 for each of the notches of the switch member 165 are adapted for operation by a stem 173 slidable in an opening 174 communicating with each of the switch notches. When the selector arm is located in any of the switch notches, one of the stems 173 associated with such notch is engaged by the selector lever and is pushed downwardly by the spring 152 to break the current through the wire 175 which connects all the switches 172 in series. Each switch 172 has a spring 176 associated therewith for restoring the switch to its contacting position and raising its stem 173 as soon as the selector lever is moved out of one of the notches. The wire 175 connects with one terminal of a storage battery 177, the other end of the wire 175 being connected to the windings 178 of the solenoid armature 144 aforesaid, which is grounded at the other terminal of the battery 177.

The manually controlled selector operating mechanism is practically instantaneous in its response to selective adjustment of the lever 153 and the different selections may be made as rapidly as desired. In the general operation of the selector mechanism E for changing the transmission speed ratio, the operator moves the selector lever 153 from one of the station notches in the switch member 165. Just as soon as the selector lever is moved from one of the notches, the switch 172 associated with such notch will be closed, thereby inducing an electrical circuit through the solenoid windings 178 for causing the solenoid armature 144 to move rearwardly against the abutment 146. This rearward movement of the solenoid armature will adjust the valve 121 rearwardly to place the fluid pressure chamber 116 of cylinder 112 in communication with the reservoir discharge conduit 148 whereupon the spring F will move the shaft D rearwardly to release any of the controlling devices 32 to 35 which might have been in operation. This entire phase of the operation takes place very quickly during the initial part of adjustment of the selector lever out of one of the notches of the switch member 165. The selector lever 153 may then be moved into any other station of control and dropped into the corresponding notch for such position.

When the selector lever is so released it will be apparent that one of the switches 172 corresponding to such newly selected position will be opened, thereby interrupting the electrical circuit through the wire 175 to the solenoid windings 178. At such time the spring 137 will immediately act to move the valve 121 and the armature 144 forwardly to establish communication between the fluid pressure supply conduit 122 and the pressure chamber 116. This will immediately cause a forward movement induced by the fluid pressure on the shaft D for operating one of the selector controlling devices which might have been selected for the new position or else for operating the shaft D without causing any movement of any of the speed ratio controlling devices in the event that neutral was selected.

Returning now to the aforesaid cycle of operation and to the point where the selector lever 153 was described as having been moved out of one of the notches preparatory to movement thereof into a newly selected notch, just as soon as the solenoid armature 144 moves rearwardly to operate the valve 121 to vent the pressure chamber 116, it will be apparent that the fluid pressure load is removed from the shaft D which is now in its rearward position so that arcuate movement of the selector lever 153 will operate through the hollow steering post shaft 101, Bowden wire mechanism 112, and sector 87 to rotatably adjust the shaft D into a new position for actuation of one of the speed ratio controlling devices. The mechanism operates almost instantaneously so that there is practically no resistance to immediate arcuate adjustment of selector lever 153 from a position in one of the notches although any binding tendency experienced at the shaft D during the initial or other tendency to move the shaft will be taken up yieldingly through the Bowden wire connection shown in Fig. 5A.

Referring now to the details of our pump H and pressure regulating means, the pump assembly includes a casing structure 179 fixed to the transmission structure through a plurality of fastener receiving holes 179ᵃ. The casing 179 receives the pump drive shaft 125 which is suitably journalled at 180 and 181 by the casing.

As illustrated, the gear 126 (best shown in Figs. 1 and 13) on the shaft 125 is in constant mesh with the idler gear 127 which in turn is drivingly connected with the fluid-impeller-associated driving pinion 128. A ported cylindrical member 182 is suitably fixed to the casing 179. The member 182 has inlet and outlet chambers 183 and 184 respectively for the fluid such as oil, admitted to the pump H and delivered therefrom under pressure.

The inlet chamber 183 is in communication with the fluid in the reservoir 124 through an inlet passage 185. Formed in the rearward portion of the member 182 are circumferentially spaced arcuate inlet and outlet ports 186 and 187.

Surrounding the shaft 125 for rotation therewith is a pump rotor 188 which is suitably fixed to the shaft 125 by a pin 189 registering with recesses 190 and 191 in the shaft and the rotor respectively. The rotor 187 has a plurality of circumferentially spaced cylinders 192 opening inwardly toward a swingably mounted wabble or swash plate 193 adapted to regulate the pressure of fluid delivered by the pump as hereinafter set forth. An annular end member 194 is fixed to the forward end of the rotor 188 for rotation therewith, the member 194 having ports 195 for each cylinder 192. As the rotor rotates these ports 195 successively register with the ports 186 and 187 so that they are alternately intake and discharge ports, as is well understood by those familiar with the art on swash plate pressure pumps of this type.

Each cylinder 192 receives a piston 196 adapted for reciprocatory movement therein. A rounded end 197 of each piston is normally adapted to slidably bear against an outer ring 198 of the swash plate 193, as will hereinafter be more apparent and each piston is urged outwardly with respect to its cylinder and into engagement with the ring 198 by a spring 199. This ring is supported by a bearing 200 carried by a swinging dished member 201 having trunnions 202 and 203 pivotally supported in the casing 179 and a cover plate 203ᵃ fixed to the casing by bolts 203ᵇ. An extension 204 of the member 201 is fixed to the pressure regulating means to thereby control the inclination of the swash plate.

A cover plate 205 is secured by fasteners 206 to the rearward face 207 of an extension of the casing 179 to close off the chamber of an auxiliary pump 208 where such pump is employed.

The pump 208 comprises a driving gear 209 and a driven gear 210 together with oil inlet 211 communicating with the reservoir 124 and outlet 212, and is adapted to supply oil under a relatively low pressure to lubricate parts of the engine A or transmission C. In communication with the outlet 212 is a conduit 213 through which the oil passes to the point of usage in the engine or transmission for lubrication thereof.

The fluid delivered by the pump H is led from the outlet chamber 184 through a series of passages 214, 215 and 216, the passage 215 communicating with the pressure conduit 123 which supplies fluid under pressure to the valve controlled cylinder 120 which slidably receives the fluid pressure supply controlling valve 121. A lead-off conduit 217 communicates with the passage 216 to convey the fluid to a further conduit 218 registering with a pressure chamber 219. The chamber 219 is formed by a piston 220 adapted to reciprocate in a cylinder 221 carried by an extension of the casing 179 and having its rearward opening closed by a threaded plug 222 including a pressure seal 223. A coil spring 224 is adapted to yieldingly urge rearwardly an end member 225 having a stem portion 226 extending through an aperture 227 of the swash plate extension 204 and into a recessed piston head member 228 fixed to the piston 220.

A forward support for the spring 224 is provided by a member 229 which has an articulated connection at 230 on a whiffle lever 231. The lever 231 includes a stem 232 pivoted at 233 to the lever, the stem having a reduced threaded shank 234 extending through an aperture 235 in the casing 179 and held by a movement-limiting fastener 236. To the other end of the lever 231 a link member 237 is pivotally connected at 238. A stem portion 239 of the member 237 extends through an opening 240 of the casing 179. A coiled spring 241—preferably of a lower rate than the spring 224—is interposed between the casing and the member 237 to yieldingly urge this member to its forward position.

A cam member 242 is fixed on a partially threaded shaft 243 journalled by the casing 179. The cam member is positioned adjacent the end of the stem portion 239 for selective registering of a plurality of cam faces 244, 245, 245ᵃ and 246, as will presently be more apparent.

Figure 18:
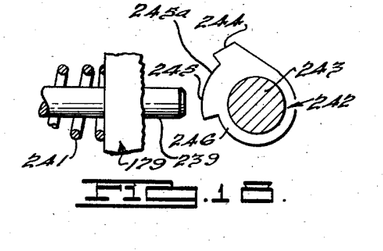
Fig. 18 is an enlarged detail sectional view taken approximately as indicated by the line 18—18 of Fig. 12.

The stem portion 239 is urged rearwardly into contact with the cam face 242 by fluid pressure moving the piston 220 to act through the heavy spring 224 as a solid member and thereby compress the light spring 241. The cam face 244 is adapted to register with the stem portion 239 when the transmission C is in its reverse drive condition. In Fig. 18 the stem portion is illustrated in its first speed position with the cam face 245, and the stem portion will be engaged with the portion 245 of this cam face when the transmission C is in its neutral condition, as will readily be more apparent. When the stem portion is adjacent the elongated cam face 246 the transmission is in either its second speed or its direct drive.

To control these various positionings of the cam member 242 an annular sealing ring 247 is seated in the casing 179 to accommodate the rotative movement imparted by a link 248 fixed to the shaft 243 by a threaded fastener 249. A connector link 250 has articulated connections 251 and 252 on the link 248 and the end of one of the arms of a bell crank is pivotally supported at 254 on the casing 179 and its outwardly extending arm provides an articulated connection 255 for a suitable remote control. To this end a connector arm 256 is pivotally connected at 257 to an extension arm 258 fixed to the end of the lever 91, thus providing a selective control through the selector lever 153 for the cam member 242. The linkage 248, 250, 253, 256 and 258 is so arranged that upon arcuate adjustment of the selector lever 153 into the notches 166, 167, 168, 169 and 170 the cam faces 245, 246, 246, 245ᵃ and 244, respectively, will be adjacent the stem portion 239.

A means for infinitely controlling the compressing of the springs 224 and 241 may be used, if desired, to regulate the pump fluid pressure independently of the aforesaid means responsive to the adjustment of the selector lever 153. A cam member 259 is fixed to a partially threaded shaft 260 journaled within the casing 179. The face of this cam member is adjacent a portion 261 of the lever 231. An annular sealing member 262 has a seat in the casing 179 and supports a link 263 fixed to the shaft 260 by a threaded fastener 264. Pivotally connected at 265 on the link 263 is a suitable remote control which may, if desired, include a movement transmitting member 266 (best shown in Fig. 1). The forward end of the member 266 has an articulated connection at 267 on the shorter arm of a pedal 268 pivotally supported at 269 to a suitable stationary support member of the clutch B. By depressing a face member 270 of the pedal 268 movement is transmitted until the link strikes the rearward extreme of a slot 271 in the casing 179 at which time the pedal face 270 is against the vehicle tow-boards 272. A resilient means such as a spring 273 may be interposed between the pedal 268 and the toe-boards 272 to yieldingly return the pedal face 270 to its illustrated position.

The relationship of the shorter arm to the longer arm of the pedal 268 can be so determined, if desired, that as the pedal face is depressed to substantially one-third of its complete movement the lower arm of the pedal will move rearwardly in a certain arc. This arc transmits sufficient rearward movement to the member 266 to rotate the cam member 259 counterclockwise (as viewed in Fig. 13) away from the part 232 to permit expansion of the springs 224 and 241 sufficiently to reduce the pump fluid pressure to about two-thirds of its maximum pressure, as will presently be more apparent. As the pedal face is moved through the remainder of its travel the cam member 259 is further rotated to evenly expand the springs 224 and 241 to gradually reduce the pump fluid pressure to zero at which time there is preferably a slight clearance between the cam member and the lever 231 by reason of the movement-limiting fastener 236 to accommodate the various adjustments of the cam member 242 relative to the stem portion 238 aforesaid. During the return movement of the pedal face 270, induced by the spring 273, the springs 224 and 241 are contracted to increase the fluid pressure of the pump in a manner just the reverse of the downward pedal movement. When the pedal face is completely returned to its illustrated position, the pump fluid pressure will be at a predetermined maximum for the selected speed ratio by reason of the proper positioning of the cam 242.

One feature of our invention resides in the simple control that is possible with our transmission system, one preferred embodiment of this control being illustrated in Fig. 2 wherein it will be observed that the selector lever 153 is positioned for manipulation laterally to the right of the steering wheel 108 for effecting a change in the condition of the transmission. Our transmission provides for convenient manipulation of the motor vehicle by providing the engine throttle control or accelerator pedal 274 preferably at the right hand side of the steering post 99 so that it may be manipulated by the right foot of the driver. On the same side of the steering post is a pedal 275 which is adapted for operating the wheel brakes of the motor vehicle, and on the other side we have provided the pedal face 270 of our completely manual pressure regulating means for convenient manipulation by the left foot. The pedal 268 is thus apparently the well known friction plate clutch pedal, and has the same "feel" when operated by the driver, as will hereinafter be more apparent.

Figure 13:
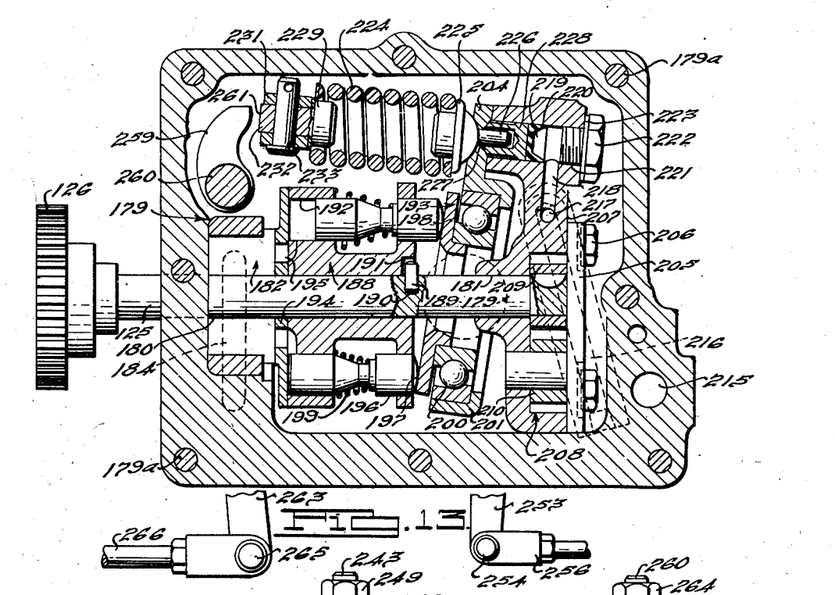
Fig. 13 is an enlarged detail sectional view taken approximately as indicated by the line 13—13 of Fig. 1.
Figure 14:
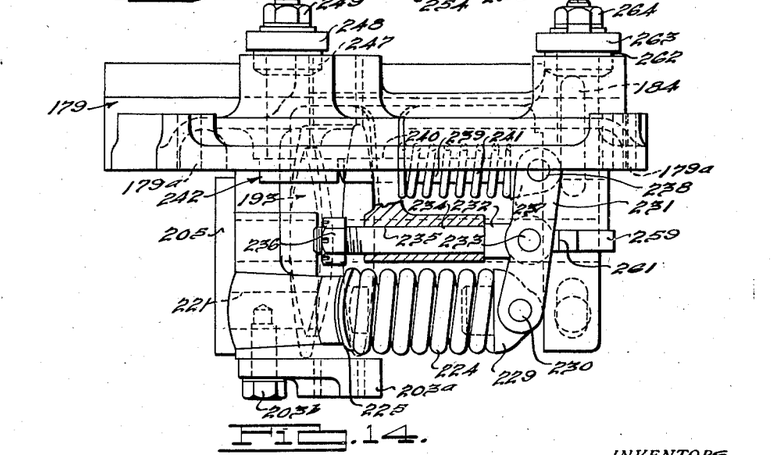
Fig. 14 is an end elevational view taken as indicated by the line 14—14 of Fig. 12.
Figures 15, 16:
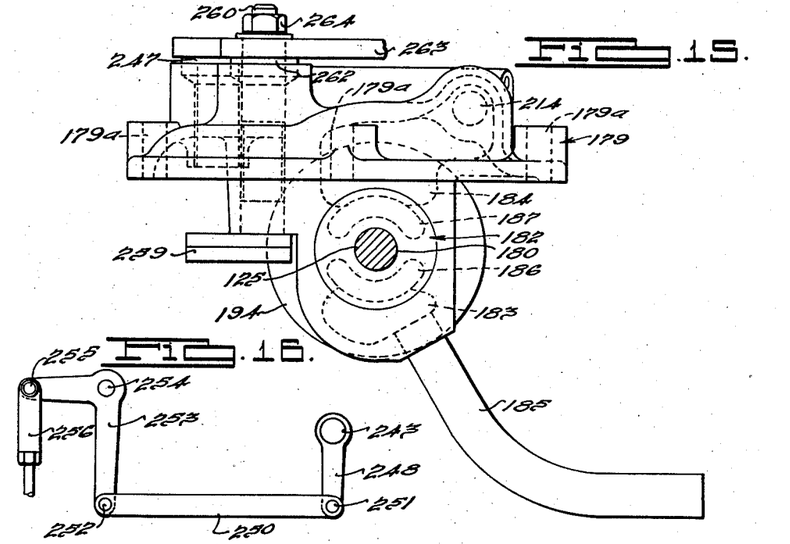
Fig. 15 is an end elevational view along the line 15—15 of Fig. 11.
Fig. 16 is a reduced detail sectional view taken along the line 16—16 of Fig. 12.

During the operation of the pump H the shaft 125 drives the rotor 188, with the plate 193 positioned as in Fig. 13 for maximum stroke for the first speed setting of the cam member 245 aforesaid, and approximately half the pistons 196 are moving inwardly drawing in fluid through the ports 186 and 195. The remaining pistons are simultaneously discharging fluid under pressure through the ports 187 and 195 for passage to the cylinder 120 and the pressure chamber 219.

When the selector lever 153 is in its first speed notch 166 and the pedal face 270 is in its normal station as illustrated, the stem portion 239 registers with the elongated cam face 245. The relationship of the effective heighth of the cam face 245, the rate of the spring 224, the ratio of the perpendicular distances from the lines of action of the connections 230 and 238 to the pivot 233, and the effective area of the piston 220 subjected to fluid pressure is such that the pump continues to produce pressure until there is sufficient fluid pressure within the chamber 219 to cause the piston 220 to impart movement through the heavy spring 224 as a solid member to compress the light spring 241 to move the stem portion 239 against the cam member 242. The pump then continues to function until there is sufficient fluid pressure within the chamber 219 to cause the piston 220 to compress the heavy spring 224 to complete the levelling off of the swash plate 193. This levelling-off pressure is the predetermined maximum fluid pressure necessary to operate the first speed controlling device 32 to satisfactorily control the torque transmitted through that gear train. The levelling-off of the plate 193 progressively lessens the stroke of the pistons 196 until they finally are substantially motionless so far as reciprocation is concerned, assuming of course, that fluid under pressure is not being relieved from the delivery system.

In a similar manner as for the first speed pump pressure control, the effective heighth of the elongated cam face 246 is sufficient to cause the piston 220 to level off the plate 193 when a predetermined maximum fluid pressure is effected to satisfactorily actuate the second or third speed ratio controlling devices 33 and 34 respectively to control the torque transmitted through their respective gear trains. Similarly, the effective heighth of the reverse speed cam face 244 is sufficient to cause the piston 220 to level off the plate 193 when a predetermined maximum fluid pressure is produced to satisfactorily actuate the reverse speed ratio controlling device 35 to control the torque transmitted through this gear train.

Our pressure regulating means thus provides, in response to the selected speed ratio controlling device, the proper actuating pressure for accommodating the torque transmitted by the engine through that particular speed ratio. Heretofore, it has been general practice to use the same pressure for energizing each of the speed ratio controlling devices of the transmission, and this was undesirable in many instances because a compromise had to be made so that the pressure was usually either too high or too low for smooth, positive, and quiet actuation of most of the speed ratio controlling devices.

While the cam member 242 is illustrated with the cam faces 244 to 246, we wish to point out that the effective heighth of these faces may be changed, or other faces may be added, without departing from the scope of our invention.

Referring to the operation of our transmission, with the fluid under pressure not being relieved from the delivery system and the pedal face 270 in its illustrated station of Fig. 1, the pump H will rapidly build up the fluid system to its aforesaid predetermined fluid pressure for the selected speed ratio and the plate 193 then progressively lessens the stroke of the pistons until they are substantially motionless so far as reciprocation is concerned. However, if the vehicle operator then desires to select another speed ratio or neutral, he lifts the lever 153 in doing so and the switch 172 associated with the notch 166, 167, 168, 169 or 170 will be closed. This closing of the switch induces an electrical circuit through the solenoid windings 178 for causing the solenoid armature 144 to move rearwardly to adjust the valve 121 to place the fluid pressure chamber 116 of cylinder 112 in communication with the reservoir discharge conduit 148 to effect a release of any of the controlling devices 32 to 35 which might have been in operation.

During this opening of the chamber 116 to the reservoir conduit 148 the escape of fluid lowers the pressure within the chamber 219 and the rest of the system to substantially zero, fluid escaping from the conduit 122 through the groove 130 and port 132 of the porting member 129 into the conduit 148. At this time the springs 224 and 241 expand to incline the plate 193 rearwardly to its illustrated position. This entire phase of the operation occurs very quickly during the initial part of the adjustment of the selector lever 153 out of one of the notches of the switch member 165.

The reduction of pressure in the system permits the vehicle operator to move the selector lever 153 into any other station of control inasmuch as the stem portion 239 is moved forwardly by the then expanded springs 224 and 241 to permit the arcuate adjustment of the cam member 242 simultaneously with the arcuate adjustment of the selector lever. When the selector lever 153 is released into the newly selected notch it will be apparent that one of the switches 172 corresponding to such newly selected position will be opened, thereby interrupting the electrical circuit through the wire 175 to the solenoid windings 178. At such time the spring 137 will immediately act to move the valve 121 and armature 144 forwardly to establish communication between the fluid pressure supply conduit 122 and the pressure chamber 116. This will immediately cause a forward movement induced by the fluid pressure on the shaft D for operating one of the selector controlling devices which might have been selected for the new position or else for operating the shaft D without causing any movement of any of the speed ratio controlling devices in the event that neutral was selected. Immediately upon this forward movement of the valve 121 the fluid pressure system is again closed and the stroke of the pump pistons 196 is increased to effect the fluid pressure determined by the newly selected cam face 244 to 246 and its influence on the springs 224, 241 and the piston 220.

The function of the foot pedal control is independent of the speed ratio responsive control to the extent that the pedal face 270 may be depressed to any degree at any time, providing the engine A is running, to vary the pressure of the springs 224 and 241 which the piston 220 must overcome to level off the swash plate 193 and thereby evenly reduce the fluid pressure to zero. During this even change in fluid pressure the vehicle operator may select the speed ratios, as described earlier, with desirable characteristics of band or clutch slippage as effected by his control of the pedal face 270. It is obviously evident that the operator need not depress the pedal face at all, inasmuch as the lifting of the lever 153 will adjust the valve 121 rearwardly to place the fluid pressure chamber 116 in communication with the reservoir discharge conduit 148 at which time the fluid pressure in the pressure system is reduced to permit the cam member 242 to be adjusted to its new position when the selector lever 153 is swung to its newly selected notch and released therein to cause the valve 121 to move forwardly to operate the transmission in the selected speed ratio.

The speed ratio change having been made with the selector arm 153, the operator preferably then returns the pedal face 270 to its normal position. This causes the selected speed ratio controlling device during that pedal face movement to smoothly and quietly increase its braking effect on the drum or clutch element in providing the newly selected speed ratio through the predetermined maximum fluid pressure for the aforesaid speed ratio.

In operating our transmission the various speed ratio selections may be made quickly and easily, aided by the speed ratio controlling device engagement characteristics effected by depressing the pedal face 270, and each speed ratio controlling device is energized sufficiently to satisfactorily handle the torque transmitted by the engine A through that gear train. This also allows a wider range in designing power transmitting devices inasmuch as the torque transmitted through each speed ratio may reasonably be out of proportion with the others.

Bearing pressures and possibilities of the failure of parts are decreased by our pressure regulating means by reason of the fluid pressure for each speed ratio controlling device being just sufficient to handle the torque transmitted through each particular speed ratio. The moving parts are therefore not subjected to continuous excess pressures and the pump H need not maintain the "compromise" high fluid pressure necessary without our regulating means.

A suitable remote control such as the illustrated pedal 268 is particularly advantageous when starting the vehicle engine in cold weather, inasmuch as the speed ratio controlling devices are allowed to slip to suit the operator's convenience as he depresses the pedal preparatory to warming up the engine or to making the speed ratio changes while driving the vehicle.

Figure 19:
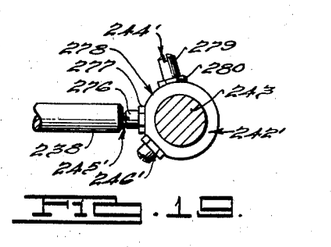
Fig. 19 is a partial detail sectional view corresponding to Fig. 18 but illustrating another embodiment of our pump pressure control.

Referring now to Fig. 19 in which we have illustrated a modified embodiment, it will be understood that this modified arrangement is intended to be substituted for the parts previously described, and the entire mechanism and its operation will not again be duplicated. Parts of similar function but different construction have been indicated by primed reference characters.

It will be noted that instead of having the cam faces 244 to 246 on the cam member 242 as in the foregoing embodiment, a screw 276 is releasably locked in the cam member 242' by a lock-nut 277. This screw 276 is illustrated in its first speed position adjacent the stem portion 238. A neutral space 278 on the cam member is provided between the screw 276 and a reverse speed screw 279 locked to the cam member by a locknut 280. A second and a third speed cam face 246' is located next to the first speed cam face 245'.

In the operation of this embodiment of our invention the screws 276 and 279 may be adjusted readily and locked by the nuts 277 and 280 respectively. The effective heighth of these screws determine the pressure of the springs 224 and 241 which the piston 220 must overcome by the produced fluid pressure before levelling off the swash plate.

By the adjustment of these cam screws the engaging characteristics of the various speed ratio controlling devices 32 to 35 may be conveniently altered. Other cam screws may be added for the other speed ratios, if desired.

Various modifications and changes may be effected in the illustrated application without departing from the spirit of the invention or from the scope of the appended claims.

What we claim is:

1. In a motor vehicle transmission having a plurality of speed ratio controlling devices, pressure fluid actuated means for selectively operating said devices, manually operable means for controlling the selective operation of said devices, means including a pump for supplying pressure fluid to said fluid actuated means, a swingingly mounted wabble plate structure for regulating the pressure of fluid delivered by said pump, said swingingly mounted wabble plate structure being adapted for swinging movement from an inclined position of maximum pump delivery to a substantially leveled off position of minimum pump delivery, means yieldingly urging said wabble plate structure toward its said inclined position, means operated by the pump delivery pressure fluid and acting on said wabble plate structure in opposition to said yielding means for swinging said wabble plate structure toward its said leveled off position, and means opposing the last said swinging movement of said wabble plate structure with selectively variable force for varying the pump delivery pressure in accordance with selective operation of said control devices, said opposing means including variable abutment means, a relatively stiff spring thrusting against said wabble plate structure and a relatively light spring intermediate said stiff spring and said variable abutment means.

2. In a motor vehicle transmission having a plurality of speed ratio controlling devices, pressure fluid actuated means for selectively operating said devices, manually operable means for controlling the selective operation of said devices, means including a pump for supplying pressure fluid to said fluid actuated means, a swingingly mounted wabble plate structure for regulating the pressure of fluid delivered by said pump, said swingingly mounted wabble plate structure being adapted for swinging movement from an inclined position of maximum pump delivery, means yieldingly urging said wabble plate structure toward its said inclined position, means operated by the pump delivery pressure fluid and acting on said wabble plate structure in opposition to said yielding means for swinging said wabble plate structure toward its said leveled off position, means opposing the last said swinging movement of said wabble plate structure with selectively variable force for varying the pump delivery pressure in accordance with selective operation of said control devices, said opposing means including variable abutment means, a relatively stiff spring thrusting against said wabble plate structure and a relatively light spring intermediate said stiff spring and said variable abutment means, and remote control means for rendering said opposing means inoperative.

3. In a motor vehicle transmission having a plurality of speed ratio controlling devices, pressure fluid actuated means for selectively operating said devices, manually operable means for controlling the selective operation of said devices, means including a pump for supplying pressure fluid to said fluid actuated means, a swingingly mounted wabble plate structure for regulating the pressure of fluid delivered by said pump, said swingingly mounted wabble plate structure being adapted for swinging movement from an inclined position of maximum pump delivery to a substantially leveled off position of minimum pump delivery, means yieldingly urging said wabble plate structure toward its said inclined position, means operated by the pump delivery pressure fluid and acting on said wabble plate structure in opposition to said yielding means for swinging said wabble plate structure toward its said leveled off position, and means for opposing said last swinging movement of said wabble plate structure for varying the pump pressure delivery in accordance with the selective operation of said devices, said last named means including a variable abutment, yielding means interposed between said abutment and said wabble plate structure and adapted to yieldably accommodate swinging movement of the latter toward its leveled off position, said yielding means including a relatively light spring and a relatively stiff spring.

4. In a motor vehicle transmission having a plurality of speed ratio controlling devices, pressure fluid actuated means for selectively operating said devices, manually operable means for controlling the selective operation of said devices, means including a pump for supplying pressure fluid to said fluid actuated means, a swingingly mounted wabble plate structure for regulating the pressure of fluid delivered by said pump, said swingingly mounted wabble plate structure being adapted for swinging movement from an inclined position of maximum pump delivery to a substantially leveled off position of minimum pump delivery, means yieldingly urging said wabble plate structure toward its said inclined position, means operated by the pump delivery pressure fluid and acting on said wabble plate structure in opposition to said yielding means for swinging said wabble plate structure toward its said leveled off position, and means for opposing said last swinging movement of said wabble plate structure for varying the pump pressure delivery in accordance with the selective operation of said devices, said last named means including a variable abutment, yielding means interposed between said abutment and said wabble plate structure and adapted to yieldably accommodate swinging movement of the latter toward its leveled off position, said yielding means including a relatively light spring and a relatively stiff spring, said variable abutment being operable to selectively limit the action of said light spring in yieldably accommodating swinging movement of said wabble plate structure toward its said leveled off position.

5. In a motor vehicle transmission having a plurality of speed ratio controlling devices, pressure fluid actuated means for selectively operating said devices, manually operable means for controlling the selective operation of said devices, means including a pump for supplying pressure fluid to said fluid actuated means, a swingingly mounted wabble plate structure for regulating the pressure of fluid delivered by said pump, said swingingly mounted wabble plate structure being adapted for swinging movement from an inclined position of maximum pump delivery to a substantially leveled off position of minimum pump delivery, means yieldingly urging said wabble plate structure toward its said inclined position, means operated by the pump delivery pressure fluid and acting on said wabble plate structure in opposition to said yielding means for swinging said wabble plate structure toward its said leveled off position, and means for opposing said last swinging movement of said wabble plate structure for varying the pump pressure delivery in accordance with the selective operation of said devices, said last named means including a variable abutment, yielding means interposed between said abutment and said wabble plate structure and adapted to yieldably accommodate swinging movement of the latter toward its leveled off position, said yielding means including a relatively light spring and a relatively stiff spring, said variable abutment being operable to selectively limit the action of said light spring in yieldably accommodating swinging movement of said wabble plate structure toward its said leveled off position and being further operable to cause said relatively stiff spring to yieldably accommodate said last mentioned movement of said wabble plate structure when said light spring is rendered inactive to accommodate said movement.

6. In a motor vehicle transmission having a plurality of speed ratio controlling devices, pressure fluid actuated means for selectively operating said devices, manually operable means for controlling the selective operation of said devices, means including a pump for supplying pressure fluid to said fluid actuated means, a swingingly mounted wabble plate structure for regulating the pressure of fluid delivered by said pump, said swingingly mounted wabble plate structure being adapted for swinging movement from an inclined position of maximum pump delivery to a substantially leveled off position of minimum pump delivery, means yieldingly urging said wabble plate structure toward its said inclined position, means operated by the pump delivery pressure fluid and acting on said wabble plate structure in opposition to said yielding means for swinging said wabble plate structure toward its said leveled off position, and means for opposing said last swinging movement of said wabble plate structure for varying the pump pressure delivery in accordance with the selective operation of said devices, said last named means including a variable abutment, yielding means interposed between said abutment and said wabble plate structure and adapted to yieldably accommodate swinging movement of the latter toward its leveled off position, said yielding means including a relatively light spring and a relatively stiff spring, said variable abutment being operable to selectively limit the action of said light spring in yieldably accommodating swinging movement of said wabble plate structure toward its said leveled off position and being further operable to cause said relatively stiff spring to yieldably accommodate said last mentioned movement of said wabble plate structure when said light spring is rendered inactive to accommodate said movement, said stiff spring acting as a substantially solid member when said light spring is operable to yieldably accommodate said swinging movement of said wabble plate structure.

7. In a motor vehicle transmission having a plurality of speed ratio controlling devices, pressure fluid actuated means for selectively operating said devices, manually operable means for controlling the selective operation of said devices, means including a pump for supplying pressure fluid to said fluid actuated means, a swingingly mounted wabble plate structure for regulating the pressure of fluid delivered by said pump, said swingingly mounted wabble plate structure being adapted for swinging movement from an inclined position of maximum pump delivery to a substantially leveled off position of minimum pump delivery, means yieldingly urging said wabble plate structure toward its said inclined position, means operated by the pump delivery pressure fluid and acting on said wabble plate structure in opposition to said yielding means for swinging said wabble plate structure toward its said leveled off position, and means for opposing said last swinging movement of said wabble plate structure for varying the pump pressure delivery, said last named means including a variable abutment, yielding means interposed between said abutment and said wabble plate structure and adapted to yieldably accommodate swinging movement of the latter toward its leveled off position, said yielding means including a relatively light spring and a relatively stiff spring, said variable abutment being operable to selectively cause one of said springs to yieldably accommodate swinging movement of said wabble plate structure toward its said leveled off position in response to the selective operation of one of said devices and being operable to cause the other of said springs to yieldably accommodate said last named movement of said wabble plate structure in response to the selective operation of another of said devices.

8. In a motor vehicle transmission having a plurality of speed ratio controlling devices, pressure fluid actuated means for selectively operating said devices, manually operable means for controlling the selective operation of said devices, means including a pump for supplying pressure fluid to said fluid actuated means, a swingingly mounted wabble plate structure for regulating the pressure of fluid delivered by said pump, said swingingly mounted wabble plate structure being adapted for swinging movement from an inclined position of maximum pump delivery to a substantially leveled off position of minimum pump delivery, means yieldingly urging said wabble plate structure toward its said inclined position, means operated by the pump delivery pressure fluid and acting on said wabble plate structure in opposition to said yielding means for swinging said wabble plate structure toward its said leveled off position, and means for opposing the last said swinging movement of said wabble plate structure for varying the pump pressure delivery in accordance with selective operation of said control devices, said opposing means including selectively operable variable abutment means, and a plurality of yieldable members having different rates of compression interposed between said abutment means and said wabble plate structure.

9. In a motor vehicle transmission having a plurality of speed ratio controlling devices, pressure fluid actuated means for selectively operating said devices, manually operable means for controlling the selective operation of said devices, means including a pump for supplying pressure fluid to said fluid actuated means, a swingingly mounted wabble plate structure for regulating the pressure of fluid delivered by said pump, said structure being adapted for swinging movement from a position to effect maximum pump pressure delivery to a position to effect minimum pump pressure delivery, means responsive to pressure of fluid delivered by said pump for swinging said structure toward a position to effect minimum pump pressure delivery, means opposing pressure movement of said structure including a plurality of yieldable members so constructed and arranged as to exert different rates of opposition to said last movement for varying the pump pressure delivery, and means responsive to the operation of said manually operable means for selectively regulating the opposition of said yieldable members in accordance with the selective operation of said control devices.

10. In a motor vehicle transmission having a plurality of speed ratio controlling devices, pressure fluid actuated means for selectively operating said devices, manually operable means for controlling the selective operation of said devices, means including a pump for supplying pressure fluid to said fluid actuated means, a swingingly mounted wabble plate structure for regulating the pressure of fluid delivered by said pump, said structure being adapted for swinging movement from a position to effect maximum pump pressure delivery to a position to effect mininmum pump pressure delivery, means responsive to pressure of fluid delivered by said pump for swinging said structure toward a position to effect minimum pump pressure delivery, means opposing pressure movement of said structure including a plurality of yieldable members so constructed and arranged as to exert different rates of opposition to said last movement for varying the pump pressure delivery means responsive to the operation of said manually operable means for selectively regulating the opposition of said yieldable members in accordance with the selective operation of said control devices, and remote control means for rendering said opposing means inoperative.

11. In a motor vehicle transmission having a plurality of speed ratio controlling devices, pressure fluid actuated means for selectively operating said devices, manually operable means for controlling the selective operation of said devices, means including a pump for supplying pressure fluid to said fluid actuated means, a swingingly mounted wabble plate structure for regulating the pressure of fluid delivered by said pump, said wabble plate structure being adapted for swinging movement from an inclined position of maximum pump delivery to a substantially leveled off position of minimum pump delivery, means operated by the pump delivery pressure fluid and acting on said wabble plate structure for swinging the latter toward its said leveled off position, and means opposing the last said swinging movement of said wabble plate structure with selectively variable force for varying the pump delivery pressure in accordance with selective operation of said control devices, said opposing means including a variable abutment means, a relatively stiff spring and a relatively light spring intermediate said abutment means and said wabble plate structure, a rod intermediate one of said springs and said abutment means and movable into engagement with the latter in response to movement of said wabble plate structure toward its leveled off position, said relatively light spring being adapted to yieldably accommodate swinging movement of said wabble plate structure toward its said last mentioned position as said rod is moved into engagement with said abutment means and said relatively stiff spring being adapted to yieldably accommodate further movement of said wabble plate structure toward its said last mentioned position when said rod is in engagement with said abutment means.

12. In a motor vehicle transmission having a plurality of speed ratio controlling devices, pressure fluid actuated means for selectively operating said devices, manually operable means for controlling the selective operation of said devices, means including a pump for supplying pressure fluid to said fluid actuated means, a swingingly mounted wabble plate structure for regulating the pressure of fluid delivered by said pump, said wabble plate structure being adapted for swinging movement from an inclined position of maximum pump delivery to a substantially leveled off position of minimum pump delivery, means operated by the pump delivery pressure fluid and acting on said wabble plate structure for swinging the latter toward its said leveled off position, and means opposing the last said swinging movement of said wabble plate structure with selectively variable force for varying the pump delivery pressure in accordance with selective operation of said control devices, said opposing means including a relatively stiff spring thrusting against said wabble plate structure and a relatively light spring acting in opposition to said first spring, a swingingly mounted abutment for said springs, a rod operably connected with said abutment, and a variable stop engageable with said rod for varying the opposition of said opposing means to movement of said wabble plate structure toward its said leveled off position.

13. In a motor vehicle transmission having a plurality of speed ratio controlling devices, pressure fluid actuated means for selectively operating said devices, manually operable means for controlling the selective operation of said devices, means including a pump for supplying pressure fluid to said fluid actuated means, a swingingly mounted wabble plate structure for regulating the pressure of fluid delivered by said pump, said wabble plate structure being adapted for swinging movement from an inclined position of maximum pump delivery to a substantially leveled off position of minimum pump delivery, means operated by the pump delivery pressure fluid and acting on said wabble plate structure for swinging the latter toward its said leveled off position, means opposing the last said swinging movement of said wabble plate structure with selectively variable force for varying the pump delivery pressure in accordance with selective operation of said control devices, said opposing means including a relatively stiff spring thrusting against said wabble plate structure and a relatively light spring acting in opposition to said first spring, a swingingly mounted abutment for said springs, a rod operably connected with said abutment, a variable stop engageable with said rod for varying the opposition of said opposing means to movement of said wabble plate structure toward its said leveled off position, and means for moving said abutment axially of said springs for varying the opposition of said opposing means independently of said variable stop.

14. In a motor vehicle transmission having a plurality of fluid pressure operated speed ratio controlling devices, means controlling the selective operation of said devices, means including a pump for supplying a fluid under operating pressure for operation of said devices, a swingingly mounted wabble plate structure for regulating the pressure of fluid delivered by said pump, said swingingly mounted wabble plate structure being adapted for swinging movement from an inclined position of maximum pump delivery to a substantially leveled off position of minimum pump delivery, means yieldingly urging said wabble plate structure toward its said inclined position, means operated by the pump delivery pressure fluid and acting on said wabble plate structure in opposition to said yielding means for swinging said wabble plate structure toward its said leveled off position, and means opposing the last said swinging movement of said wabble plate structure with selectively variable force for varying the pump delivery pressure in accordance with selective operation of said control devices, said opposing means including variable abutment means, a relatively stiff spring thrusting against said wabble plate structure and a relatively light spring intermediate said stiff spring and said variable abutment means.

15. In a motor vehicle transmission having a plurality of fluid pressure operated speed ratio controlling devices, means controlling the selective operation of said devices, means including a pump for supplying a fluid under operating pressure for operation of said devices, a swingingly mounted wabble plate structure for regulating the pressure of fluid delivered by said pump, said swingingly mounted wabble plate structure being adapted for swinging movement from an inclined position of maximum pump delivery to a substantially leveled off position of minimum pump delivery, means yieldingly urging said wabble plate structure toward its said inclined position, means operated by the pump delivery pressure fluid and acting on said wabble plate structure in opposition to said yielding means for swinging said wabble plate structure toward its said leveled off position, and means for opposing the last said swinging movement of said wabble plate structure for varying the pump pressure delivery in accordance with selective operation of said control devices, said opposing means including selectively operable variable abutment means, and a plurality of yieldable members having different rates of compression interposed between said abutment means and said wabble plate structure.

16. In a motor vehicle transmission having a plurality of fluid pressure operated speed ratio controlling devices, means controlling the selective operation of said devices, means including a pump for supplying a fluid under operating pressure for operation of said devices, a swingingly mounted wabble plate structure for regulating the pressure of fluid delivered by said pump, said structure being adapted for swinging movement from a position to effect maximum pump pressure delivery to a position to effect minimum pump pressure delivery, means responsive to pressure of fluid delivered by said pump for swinging said structure toward a position to effect minimum pump pressure delivery, means opposing pressure movement of said structure including a plurality of yieldable members so constructed and arranged as to exert different rates of opposition to said last movement for varying the pump pressure delivery, and means responsive to the operation of control means for selectively regulating the opposition of said yieldable members in accordance with the selective operation of said control devices.

17. In a motor vehicle transmission having a plurality of fluid pressure operated speed ratio controlling devices, means controlling the selective operation of said devices, means including a pump for supplying a fluid under operating pressure for operation of said devices, a swingingly mounted wabble plate structure for regulating the pressure of fluid delivered by said pump, said structure being adapted for swinging movement from a position to effect maximum pump pressure delivery to a position to effect minimum pump pressure delivery, means responsive to pressure of fluid delivered by said pump for swinging said structure toward a position to effect minimum pump pressure delivery, means opposing pressure movement of said structure including a plurality of yieldable members so constructed and arranged as to exert different rates of opposition to said last movement for varying the pump pressure delivery, means responsive to the operation of said manually operable means for selectively regulating the opposition of said yieldable members in accordance with the selective operation of said control devices, and remote control means for rendering said opposing means inoperative.

18. In a motor vehicle transmission having a plurality of fluid pressure operated speed ratio controlling devices, means controlling the selective operation of said devices, means including a pump for supplying a fluid under operating pressure for operation of said devices, a swingingly mounted wabble plate structure for regulating the pressure of fluid delivered by said pump, said wabble plate structure being adapted for swinging movement from an inclined position of maximum pump delivery to a substantially leveled off position of minimum pump delivery, means operated by the pump delivery pressure fluid and acting on said wabble plate structure for swinging the latter toward its said leveled off position, and means opposing the last said swinging movement of said wabble plate structure with selectively variable force for varying the pump delivery pressure in accordance with selective operation of said control devices, said opposing means including a variable abutment means, a relatively stiff spring and a relatively light spring intermediate said abutment means and said wabble plate structure, a rod intermediate one of said springs and said abutment means and movable into engagement with the latter in response to movement of said wabble plate structure toward its leveled off position, said relatively light spring being adapted to yieldingly accommodate swinging movement of said wabble plate structure toward its said last mentioned position as said rod is moved into engagement with said abutment means and said relatively stiff spring being adapted to yieldably accommodate further movement of said wabble plate structure toward its said last mentioned position when said rod is in engagement with said abutment means.

19. In a motor vehicle transmission having a plurality of fluid pressure operated speed ratio controlling devices, means controlling the selective operation of said devices, means including a pump for supplying a fluid under operating pressure for operation of said devices, a swingingly mounted wabble plate structure for regulating the pressure of fluid delivered by said pump, said wabble plate structure being adapted for swinging movement from an inclined position of maximum pump delivery to a substantially leveled off position of minimum pump delivery, means operated by the pump delivery pressure fluid and acting on said wabble plate structure for swinging the latter toward its said leveled off position, and means opposing the last said swinging movement of said wabble plate structure with selectively variable force for varying the pump delivery pressure in accordance with selective operation of said control devices, said opposing means including a relatively stiff spring thrusting against said wabble plate structure and a relatively light spring acting in opposition to said first spring, a swingingly mounted abutment for said springs, a rod operably connected with said abutment, and a variable stop engageable with said rod for varying the opposition of said opposing means to movement of said wabble plate structure toward its said leveled off position.

20. In a power transmitting mechanism including a plurality of fluid pressure operated speed ratio control devices, means operable to control operation of said devices, a pump for supplying a fluid under operating pressure for operation of said devices, a control member movable in one direction for varying the fluid delivery output of said pump, a plurality of yieldable elements adapted to exert respectively different rates of opposition to said movement of said member, and means operable to vary said opposition of at least one of said elements in response to operation of said control means.

21. In a power transmitting mechanism including a plurality of fluid pressure operated speed ratio control devices, means operable to control operation of said devices, a pump for supplying a fluid operating pressure for operation of said devices, a control member movable in one direction for varying the fluid delivery output of said pump, a plurality of yieldable elements adapted to exert respectively different rates of opposition to said movement of said member, an abutment for said elements pivotally movable to vary the opposition of at least one of said elements to said movement of said member, and means operable to effect pivotal movement of said abutment in response to operation of said control means.

22. In a power transmitting mechanism including a plurality of fluid pressure operated speed ratio control devices, means operable to control operation of said devices, a pump for supplying a fluid under operating pressure for operation of said devices, a control member movable in one direction for varying the fluid delivery output of said pump, a plurality of yieldable elements adapted to exert respectively different rates of opposition to said movement of said member, an abutment for said elements pivotally movable to vary the opposition of at least one of said elements to said movement of said member, means operable to effect pivotal movement of said abutment in response to operation of said control means, and means operable to effect movement of said abutment in a direction substantially longitudinally with respect to the direction of force applied thereto by said elements.

CARL A. NERACHER.
WILLIAM T. DUNN.